July 19, 1960
G. C. HAYSLIP
2,945,658
SUPPORTING MEANS FOR FISH NETS
Filed Aug. 13, 1958
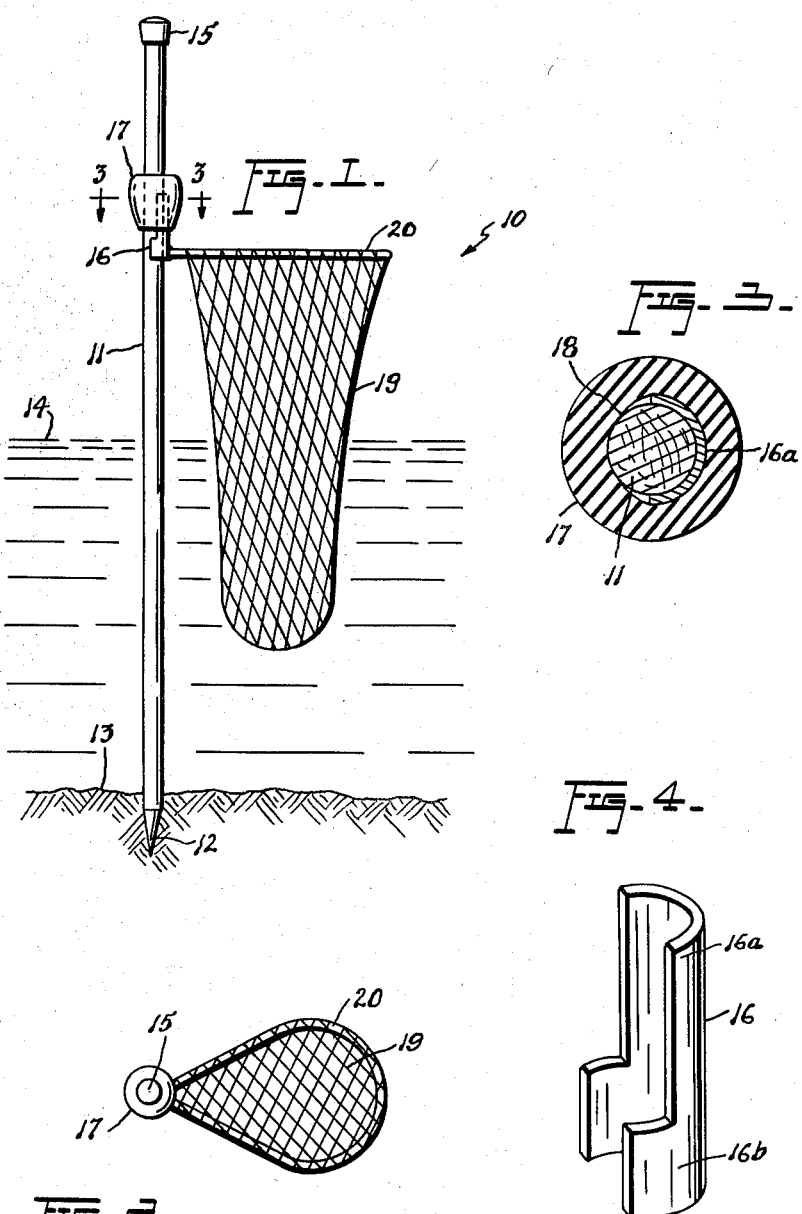
Inventor:
Gerald C. Hayslip
By
Atty.

United States Patent Office 2,945,658
Patented July 19, 1960

2,945,658

SUPPORTING MEANS FOR FISH NETS

Gerald C. Hayslip, 5535 Thrill Place, Denver, Colo.

Filed Aug. 13, 1958, Ser. No. 754,819

4 Claims. (Cl. 248—125)

This invention relates to new and useful improvements in fish nets and particularly to supporting means for such nets, and the principal object of the invention is to enable a fisherman to keep caught fish alive in a portable net immersed in water.

An important feature of the invention resides in the provision of net supporting means including a post which may be driven in the bottom of a body of water so that it projects above the water level, together with a net holder which is vertically adjustable on the upper portion of the post so that the net carried thereby may be immersed to an appropriate depth in the water to keep the fish in the net alive.

Another important feature of the invention resides in the provision of novel means for adjustably attaching the net holder to the post and releasably locking the same in a pre-adjusted position.

Some of the advantages of the invention reside in its simplicity of construction, efficient operation, in its ease of portability, and in its adaptability to economical manufacture.

With the above more important object and features in view and such other objects and features as may become apparent as this specification proceeds, the invention will be understood from the following description taken in conjunction with the accompanying drawings, wherein like characters of reference are used to designate like parts, and wherein:

Figure 1 is a side elevational view of the invention;

Figure 2 is a top plan view thereof;

Figure 3 is a sectional detail on an enlarged scale, taken substantially in the plane of the line 3—3 in Figure 1; and Figure 4 is a perspective view of the clamp member used in the invention.

Referring now to the accompanying drawings in detail, the net and supporting means in accordance with the invention are designated generally by the reference numeral 10 and embody in construction an upright supporting post 11 having a pointed lower end 12 adapted to be driven in the bottom 13 of a body of water 14, such as rivers, lakes, and the like. The upper end of the post is provided with a suitable cap 15.

The net holder comprises a substantially semi-tubular clamp member 16, best shown in Figure 4, which is positioned against the side of the post 11 and may be adjusted vertically relative thereto. The upper end portion of the member 16 is substantially semi-circular in cross-section as indicated at 16a, while its lower end portion 16b is of a circumferentially greater length, as shown.

The member 16 may be releasably locked in a preadjusted position on the post 11 by means of a locking member 17 which is substantially in the form of a sphere or ring and is made of suitable resilient material such as rubber, or the like. The member 17 is provided with a central bore 18 to receive the post 11 as well as the upper portion 16a of the clamp member 16, the relative diameters of the parts being such that when the locking member 17 is passed over the clamp member portion 16a positioned against the side of the post 11, the bore 18 of the locking member is stretched and distorted so as to urge the clamp member in frictional engagement with the post and retain the same in a preadjusted position thereon.

Upon sliding of the member 17 off the member 16, the clamp member 16 may be moved upwardly or downwardly on the post, as will be clearly understood.

The net 19 of a suitable conventional type is suspended from a supporting member 20 which is preferably formed from wire rod or the like and has its ends suitably secured, such as by welding, to the lower portion 16b of the clamp member 16. It will be noted from the foregoing that by adjusting the position of the member 16 on the post 11, the height of the net relative to the water level may be varied as desired, so that the bottom portion of the net is immersed in water and any fish placed in the net are kept alive.

The supporting member 20 serves to keep the mouth of the net open so that fish may be inserted or removed without the need of the fisherman holding the net mouth open with his hands. When fish are placed in the bottom of the net, the bottom portion of the net becomes inflated, so to speak, and the upper portion of the net automatically contracts through distention.

Although the post 11 is primarily intended to be driven in the bottom of a body of water, the invention may be also used with an upright post suitably secured to a wharf, or to the gunwale of a boat, or the like, and the adjustable positioning of the net holder on the post will at all times assure that the bottom portion of the net is immersed in water.

It may be also noted that although the invention is primarily intended for use with a fishing net, it may be also used for supporting nets in general, as well as bags or other similar receptacles.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In an article support, the combination of an upright post, a clamp member positioned against the side of said post and adjustable vertically relative thereto, a locking member of resilient material having a bore therein embracingly receiving said post and said clamp member whereby to urge the clamp member in frictional engagement with the post and sustain the clamp member in a pre-adjusted position on the post, and an article supporting element provided on the clamp member.

2. An article support, comprising in combination an upright post, a vertically elongated and substantially semi-tubular clamp member positioned against the side of said post and adjustable vertically relative thereto, a locking member of resilient material having a bore therein embracingly receiving said post and the upper end portion of said clamp member whereby to urge the clamp member in frictional engagement with the post and sustain the clamp member in a pre-adjusted position on the post, and an article supporting element secured to the lower end portion of said clamp member.

3. The device as defined in claim 2 wherein the lower end portion of said clamp member is of a circumferentially greater length than the upper end portion thereof.

4. In a cantilever article support, the combination of a slender cylindrical upright post, a vertically elongated and substantially semi-tubular clamp member positioned laterally against said post and adjustable vertically thereon, said clamp member including an upper portion and a lower portion of a circumferentially greater length than said upper portion whereby opposite side edge regions of the lower portion project circumferentially beyond corresponding opposite side edges of the upper portion, the inside radius of said clamp member corresponding to one-half the diameter of said post whereby the clamp member snugly embraces the post with said lower portion of the clamp member embracing a circumferentially larger span than half the circumference of the post, a substantially spherical locking member of resilient material provided with a cylindrical bore receiving therein said post and the upper portion of said clamp member, the diameter of the bore in said locking member initially corresponding to the diameter of the post whereby the locking member is tensioned to accommodate the post and the upper portion of the clamp member thereagainst and whereby the clamp member is frictionally retained in a vertically adjusted position on the post, and an article supporting member secured to and projecting laterally from the lower portion of the clamp member.

References Cited in the file of this patent

UNITED STATES PATENTS

| | | |
|---|---|---|
| 92,579 | Bush | July 13, 1869 |
| 1,439,878 | Erhardt et al. | Dec. 26, 1922 |
| 2,591,891 | Thorsen | Apr. 8, 1952 |
| 2,765,580 | Herrschaft | Oct. 9, 1956 |